(No Model.)
G. R. STETSON.
REAMER.
No. 312,920. Patented Feb. 24, 1885.
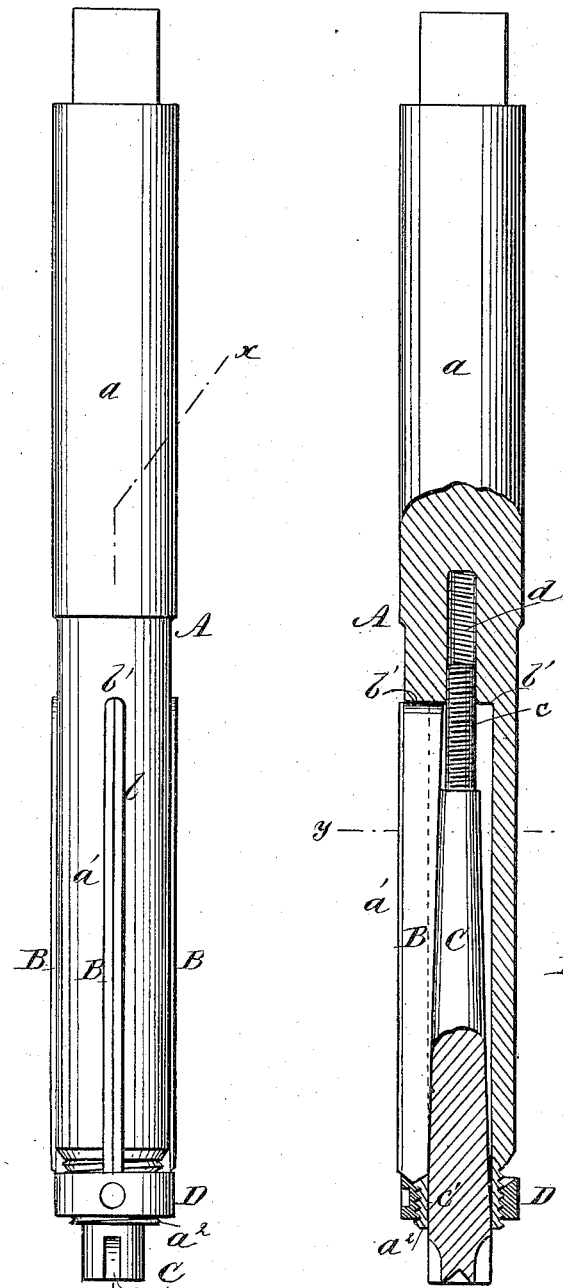
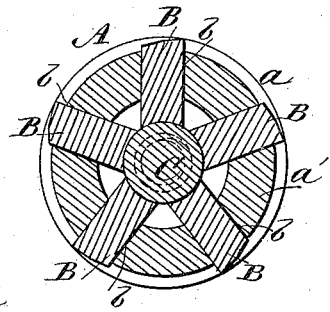
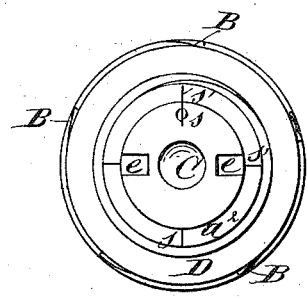
WITNESSES:
C. Neveux
C. Sedgwick
INVENTOR:
G. R. Stetson
BY Munn & Co
ATTORNEYS.

UNITED STATES PATENT OFFICE.

GEORGE R. STETSON, OF NEW BEDFORD, MASSACHUSETTS, ASSIGNOR TO HIMSELF AND THE MORSE TWIST DRILL AND MACHINE COMPANY, OF SAME PLACE.

REAMER.

SPECIFICATION forming part of Letters Patent No. 312,920, dated February 24, 1885.

Application filed March 19, 1884. (No model.)

*To all whom it may concern:*

Be it known that I, GEORGE R. STETSON, of New Bedford, in the county of Bristol and State of Massachusetts, have invented certain new and useful Improvements in Adjustable Reamers, of which the following is a full, clear, and exact description.

This invention relates to adjustable or expanding reamers for smoothing, straightening, dressing, or enlarging holes in various kinds of work, and in which the body of the reamer has any number of elongated radial slots in it for the reception of a corresponding number of radial cutters that are adjusted outward, as required, by an inner cone having a screw adjustment, and arranged to bear on the backs of the cutters, also in which a concave nut acting on the ends of the cutters, made beveling to fit said nut, is used to tighten and hold the cutters as adjusted; and the invention consists in a reamer of such description in which the parts or certain of them are constructed and combined to produce an expanding reamer of superior form and build, and whereby increased facilities are afforded for regulating the adjustment of the cutters, substantially as hereinafter described.

Reference is to be had to the accompanying drawings, forming part of this specification, in which similar letters of reference indicate corresponding parts in all the figures.

Figure 1 represents an exterior longitudinal view of an expanding reamer embodying my invention; Fig. 2, a partly-sectional longitudinal view, on the line $x\,x$ in Fig. 1, of the same. Fig. 3 is an end view upon an enlarged scale, looking toward the adjusting end of the reamer; and Fig. 4, a transverse section, also upon an enlarged scale, on the line $y\,y$ in Fig. 2.

A indicates the body of the reamer, that is or may be made of different diameters, the main or solid portion $a$ beyond the cutters being of full standard size, and being suitably constructed at its outer end to provide for the turning or rotation of the reamer, as required, while the portion $a'$, in which the cutters are arranged, is or may be of slightly-reduced diameter.

B B are the elongated radial cutters, that are disconnected or independent of each other, and are constructed to closely fit within the longitudinal radial slots $b\,b$ in the portion $a'$ of the stock or body, said cutters, when intended to ream a hole of equal diameter throughout, being so constructed that while, when in place, their outer or cutting edges are parallel, their inner ones or backs conform to the cone or longitudinally-central adjusting device C, by which the cutters are expanded. This conical adjusting device C has a cylindrical extension, $c$, upon its inner or smaller end, upon which a screw-thread is cut, that fits a correspondingly-threaded aperture, $d$, in the body A, to provide for the working in or out of the cone, accordingly as it is required to expand the cutters B B or to set or return them inward. There consequently is no projection of the screw at the end of the cone through the body of the reamer; but said cone, which bears throughout its whole tapering surface on the backs or inner edges of the cutters, is turned to give the necessary adjustment by applying a suitable tool to the opposite larger end of the cone, which end may be slotted, as at $e\,e$, or squared for the purpose. The outer end portion, $c'$, of the cone C, where it works through a reduced outer end portion, $a^2$, of the body A, is made cylindrical or straight, whereby the cone is steadied and guided in its course. The radial slots $b\,b$ in the portion $a'$ of the body are made square or straight at their inner ends, $b'$, and the back ends of the cutters B are shaped to correspond, so that they bear firmly and squarely against said inner radial ends of the slots. This construction of the cutters and fit of them to the ends $b'$ of the slots $b$ only render necessary a single concave nut, D, to lock or hold the cutters in position, said nut, which is adjustable on the reduced end portion, $a^2$, of the body, that has a screw-thread for the purpose, being arranged to engage with the front ends of the cutters, which ends are beveled to fit the concave in the face of the nut. Upon slackening this single nut D the several detached cutters may be taken out to repair or sharpen them, as required. By means of this single nut, too, the portion $a$ of the body A at the back of the cutters may be maintained at nearly its full size. Upon screwing up the nut D its tendency is to hold down the front ends of the cutters and to force the cutters up against the inner square ends, $b'$, of the slots $b$. The larger and outer end of the conical adjusting device C is indexed, as at $s$, and the adjacent reduced end portion, $a^2$, of the body A graduated or marked, as at $s'$, to indicate the amount of expansion given to the reamer.

Having thus described my invention, I claim as new and desire to secure by Letters Patent—

The combination of the reamer-body A, having its rear portion, $a$, of elongated cylindrical shape and standard size or diameter suited to the work to which the reamer is adapted, and having its forward slotted portion, $a'$, in which the cutters are arranged, of reduced diameter, and terminating in an outer externally-screw-threaded end portion, $a^2$, the radial cutters B, of square and tapering shape at their opposite ends, as described, the concave cutter-holding nut D, arranged to fit over the screw-threaded end portion, $a^2$, and the adjustable conical device C, constructed to only partly enter at its screw-threaded end the body of the reamer in rear of the cutters, and of smooth cylindrical construction at its outer end portion, $c'$, for guidance within and through the outer end portion, $a^2$, of the body, substantially as shown and described.

GEORGE R. STETSON.

Witnesses:
FRANCIS B. GREENE,
HENRY B. WORTH.